(12) United States Patent
Chaput et al.

(10) Patent No.: US 11,988,153 B2
(45) Date of Patent: May 21, 2024

(54) ASSEMBLY FOR AN AIRCRAFT GAS TURBINE ENGINE COMPRISING AN ACCESSORY GEARBOX

(71) Applicant: SAFRAN TRANSMISSION SYSTEMS, Colombes (FR)

(72) Inventors: Florian Pierre-Yves Chaput, Moissy-Cramayel (FR); Fanélie Violaine Drevon, Moissy-Cramayel (FR); Thomas Marie Joseph De Dreuille De Longeville, Moissy-Cramayel (FR); Quentin Pierre Henri Pigott, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/848,966

(22) Filed: Jun. 24, 2022

(65) Prior Publication Data

US 2022/0412270 A1    Dec. 29, 2022

(30) Foreign Application Priority Data

Jun. 25, 2021  (FR) ...................................... 2106834

(51) Int. Cl.
*F02C 7/36* (2006.01)
*F01D 25/24* (2006.01)

(52) U.S. Cl.
CPC ................ *F02C 7/36* (2013.01); *F01D 25/24* (2013.01); *F05D 2260/4031* (2013.01)

(58) Field of Classification Search
CPC ..... F02C 7/36; F01D 25/24; F05D 2260/4031
See application file for complete search history.

(56) References Cited

U.S. PATENT DOCUMENTS

2014/0013769 A1    1/2014   Martin et al.

FOREIGN PATENT DOCUMENTS

| EP | 2607658 A2 * | 6/2013 | ............... F02C 7/20 |
| EP | 2 815 980 A1 | 12/2014 | |
| FR | 2 952 672 A1 | 5/2011 | |
| FR | 3 012 845 A1 | 5/2015 | |
| FR | 3012845 A1 * | 5/2015 | ............. B64D 27/26 |

OTHER PUBLICATIONS

Machine Translation of FR3012845A1 PDF File Name: "FR3012845A1_Machine_Translation.pdf".*
Search Report of French Application No. 2106834 dated Mar. 10, 2022.

* cited by examiner

*Primary Examiner* — Grant Moubry
*Assistant Examiner* — Ruben Picon-Feliciano
(74) *Attorney, Agent, or Firm* — Sughrue Mion, PLLC (57) ABSTRACT

An assembly for a gas turbine engine includes a casing centered on a longitudinal axis and including an upstream portion, a central portion and a downstream portion arranged successively along the longitudinal axis, an attachment system include plural tie rods, and an accessory gearbox arranged within a space delimited axially by the upstream portion and the downstream portion and radially by the central portion, the accessory gearbox being solely attached to the upstream portion or solely attached to the downstream portion by the attachment system.

10 Claims, 4 Drawing Sheets

ASSEMBLY FOR AN AIRCRAFT GAS TURBINE ENGINE COMPRISING AN ACCESSORY GEARBOX

FIELD OF THE INVENTION

The present invention relates to the general field of gas turbine engines, in particular aeronautical gas turbine engines. The present disclosure relates to the mounting of accessory gearboxes in a gas turbine engine of this type, and more particularly an assembly for an aircraft gas turbine engine comprising an accessory gearbox.

PRIOR ART

In a gas turbine engine, used for example in the propulsion of an aircraft such as an airplane or a helicopter, equipment such as pumps for the production of hydraulic energy, fuel supply and lubrication or electrical generators for the production of electrical power are grouped on an accessory gearbox (AGB) commonly called an accessory section or housing.

A gearbox of this type generally carries one or more gear trains which are driven in rotation by power drawn from a driving shaft of the gas turbine engine to which the different accessories are coupled.

For various reasons, the accessory gearbox can be provided around the casing(s) of a compression section of the gas turbine engine. Under these circumstances, the accessory gearbox is generally attached to at least one of the casings. However, this can lead to a phenomenon of ovalization of the casing, which limits the performance of the compressor. This is all the more problematical in that the compression section casings, and in particular the high-pressure compressor casings, have dimensions and/or properties which favor the performance of the compression section. This performance being all the more important with a reduced mass.

Faced with this problem, patent application FR 2 952 672 proposes suspending the accessory gearbox from the beam (also called a pylon) located above one of the casings of the compression section and by which the gas turbine engine is hung from the wing of an airplane, in a configuration where the suspension of the gas turbine engine from this beam occurs by means of an intermediate casing of the engine.

Although satisfactory in certain cases, a solution of this type is difficult to implement. In addition, this solution requires some linkages which can be complex or bulky.

There exists therefore a need to remedy at least one of the disadvantages of the prior art.

DISCLOSURE OF THE INVENTION

One object of the invention is to facilitate the attachment of the accessory gearbox within a gas turbine engine comprising a compression section, without however jeopardizing the mechanical resistance of the compression section.

To this end an assembly for a gas turbine engine is proposed according to a first aspect of the invention, comprising:
- a casing centered on the longitudinal axis of the gas turbine engine, the casing comprising an upstream portion, a central portion and a downstream portion arranged successively along the longitudinal axis;
- an accessory gearbox arranged within a space delimited axially by the upstream portion and the downstream portion, and delimited radially by the central portion;

the assembly being characterized in that the accessory gearbox is solely attached to the upstream portion and/or to the downstream portion, by means of an attachment system comprising a plurality of tie rods, the attachment system preferably comprising at least three tie rods.

Attaching the accessory gearbox solely to the upstream portion of the casing (typically the intermediate casing) and, if appropriate, to the downstream portion (typically the turbine casing), allows dispensing with an attachment both to the central portion (typically the compression section casing, in particular the high-pressure compressor casting), and to a beam for hanging to a wing of an airplane. In addition, this allows adaptation to any type of gas turbine engine, particularly those for aircraft, without necessitating the addition of a beam. Moreover, the attachments of the accessory gearbox are simplified, which offers greater freedom of design for other aspects of the gas turbine engine. Typically, this attachment mode allows the use of tangential or axial accessory gearbox casings, while retaining the possibility of positioning devices on the upstream and downstream face of the accessory gearbox casing, but also while retaining the use of an angle gear. Moreover, this attachment mode does not necessarily necessitate the development of new attachment means, because it is possible to employ attachment means which have already been proven during the operation of gas turbine engines. Finally, this attachment mode allows retaining an arrangement of the accessory gearbox in the area of the gas turbine engine corresponding to the compression section, and more particularly at the high-pressure compressor, which has numerous advantages in terms of bulk and of access for maintenance, but also for balancing and the performance of the gas turbine engine.

Advantageously, but optionally, the assembly according to the invention can comprise one at least of the following features, taken alone or in combination:
- the accessory gearbox is arranged axially at a distance from the upstream portion,
- the attachment system comprises from three to six tie rods,
- at least one tie rod has an adjustable length,
- the attachment system comprises at least one tie rod connecting the accessory gearbox to the downstream portion and at least one tie rod connecting the accessory gearbox to the upstream portion,
- at least one tie rod is connected to one at least among the accessory gearbox, the upstream portion and the downstream portion by means of a ball joint,
- the accessory gearbox comprises a plurality of walls defining a housing on which at least one device is fixedly mounted, at least one tie rod being connected to the housing,
- the assembly further comprises a transfer gearbox comprising:
  - a power transmission shaft configured to transmit mechanical power extracted from an driving shaft of the gas turbine engine to the accessory gearbox;
  - a radial shaft configured to extract mechanical power from the driving shaft; and
  - a angle gear connecting the power transmission shaft to the radial shaft, the angle gear being attached to the upstream portion,
- the assembly further comprises a transfer gearbox comprising:

a power transmission shaft configured to transmit mechanical power extracted from a driving shaft of the gas turbine engine to the accessory gearbox;

a radial shaft configured to extract mechanical power from the driving shaft; and a angle gear connecting the power transmission shaft to the radial shaft;

the transfer gearbox comprising a structural element surrounding the power transmission shaft, the structural element being rigidly attached to the accessory gearbox and to the angle gear, the angle gear being mounted on the upstream portion by means of a slide link, and it comprises:

a compression section comprising a low-pressure compressor and a high-pressure compressor;

a low-pressure compressor casing housing the low-pressure compressor;

a high-pressure compressor casing housing the high-pressure compressor;

an intermediate casing centered on the longitudinal axis and extending between the low-pressure compressor casing and the high-pressure compressor casing;

an additional casing extending downstream of the high-pressure compressor casing; the intermediate casing comprising the upstream portion, the high-pressure compressor casing comprising the central portion and the additional casing comprising the downstream portion.

According to a second aspect, the invention relates to a gas turbine engine comprising and assembly as previously described.

According to a third aspect, the invention relates to an aircraft comprising a gas turbine engine as previously described.

DESCRIPTION OF THE FIGURES

Other features, objects and advantages of the invention will be revealed by the description that follows, which is purely illustrative and not limiting, and which must be read with reference to the appended drawings in which.

In all the figures, similar elements bear identical reference symbols.

DETAILED DESCRIPTION OF THE INVENTION

Gas Turbine Engine

A gas turbine engine 1, like that illustrated in FIG. 1, generally extends along a longitudinal axis X-X and is generally found for example intended to be mounted on an aircraft (not shown), such as an airplane or a helicopter, for example below the wing of the aircraft, on the wing or even at the rear of the fuselage of the aircraft.

Figure 1:
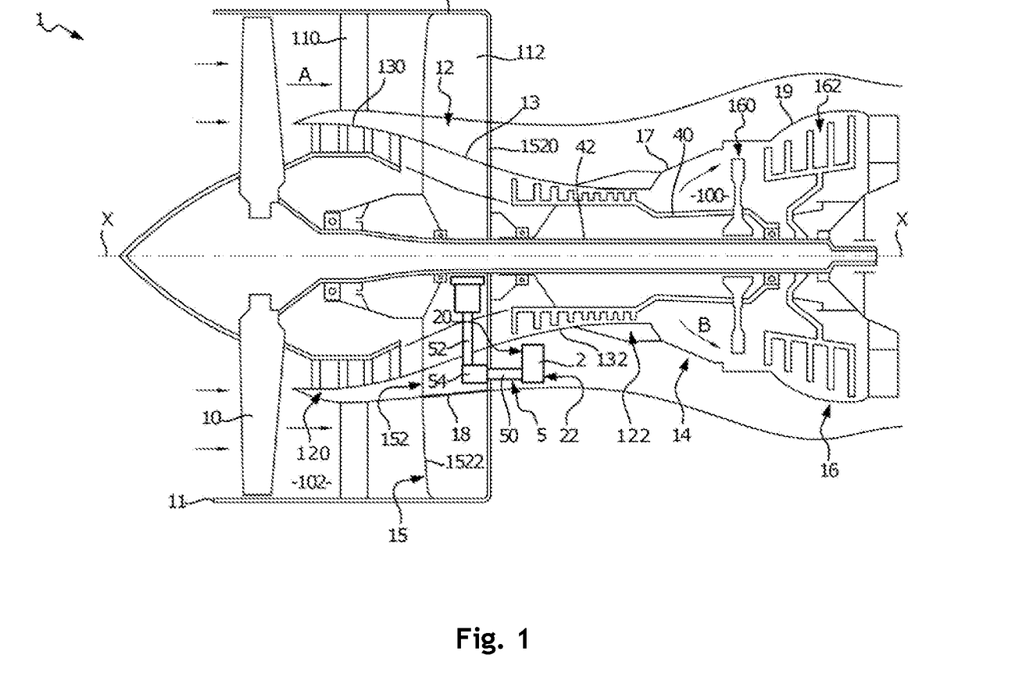
FIG. 1 illustrates a schematic section view of a gas turbine engine.

The gas turbine engine 1 may be a turbofan engine, with double flow and direct drive, as illustrated in FIG. 1. This, however, is not limiting because the gas turbine engine 1 may not be intended to be mounted on an aircraft, may be another type of turbojet, such as a geared turbofan, a turboprop or an auxiliary power unit (APU).

Hereafter, an axial direction corresponds to the direction of the longitudinal axis X-X and a radial direction is a direction perpendicular to the longitudinal axis X-X and intersecting the longitudinal axis X-X. Likewise, an axial plane is a plane containing the longitudinal axis X-X and a radial plane is a plane perpendicular to the longitudinal axis X-X. A circumference is understood to be a circle belonging to a radial plane and the center of which belongs to the longitudinal axis X-X. A tangential direction is a direction tangent to a circumference: it is perpendicular to the longitudinal axis X-X but does not pass through the longitudinal axis X-X.

Unless otherwise stated, the adjectives "inner" and "outer" are used with reference to a radial direction, so that the inner part of an element is, along the radial direction, closer to the longitudinal axis X-X than the outer part of the same element.

Moreover, unless otherwise stated, the terms "upstream" and "downstream" are used with reference to the overall gas flow direction through the gas turbine engine 1 during operation.

As may be seen in FIG. 1, the gas turbine engine 1 may comprise, from upstream to downstream, a fan 10, a compression section 12 comprising a low-pressure compressor 120 and a high-pressure compressor 122, a combustion chamber 14 and a turbine section 16 comprising a high-pressure turbine 160 and a low-pressure turbine 162. The longitudinal axis X-X then forms an axis of rotation of at least a portion of the compression section 12 and of the turbine section 16 with respect to the casings 11, 130, 132, 15, 17, 19 described hereafter.

During operation, the fan 10 may aspire an air flow of which a portion is, successively, compressed within the compression section 12, ignited within the combustion chamber 14, and expended within the turbine section 16 before being ejected out of the gas turbine engine 1. In this manner, the gas turbine engine 1 is able to generate a thrust. This thrust may thus, for example, benefit the aircraft to which the gas turbine engine 1 is mounted and attached.

Gas Turbine Engine Casings

In addition, the gas turbine engine 1 may comprise, from upstream to downstream, a fan casing 11, which is disposed annularly around the fan 10, a compression casing 13 housing the compression section 12, an intermediate casing 15, a combustion chamber casing 17 housing the combustion chamber 14, and a turbine casing 19 housing the turbine section 16.

Each casing 11, 13, 15, 17, 19 may be centered on the longitudinal axis X-X. If necessary, one at least of these casings 11, 13, 15, 17, 19 may be divided into several sections.

For example, the turbine casing 19 may comprise a high-pressure turbine casing housing the high-pressure turbine 160, an inter-turbine casing and a low-pressure turbine casing housing the low-pressure compressor 162.

Likewise, the compression casing 13 may comprise a low-pressure compressor casing 130 housing the low-pressure compressor 120 and a high-pressure compressor casing 132 housing the high-pressure compressor 122.

When necessary, as may be seen in FIG. 1, the intermediate casing 15 extends between the low-pressure compressor casing 130 and the high-pressure compressor casing 132. More precisely, the intermediate casing 15 is located downstream of the fan casing 11 and of the low-pressure compressor casing 130, but upstream of the high-pressure compressor casing 132.

In addition, the combustion chamber casing 17, the high-pressure turbine casing, the inter-turbine casing and the low-pressure turbine casing each form an example of a turbine casing 17, 19 extending downstream of the high-pressure compressor casing 132.

The different casings 11, 130, 132, 15, 17, 19 may be annular, or even axisymmetrical, and are centered on the longitudinal axis X-X.

At all events, all or part of the casings 11, 13, 15, 17, 19 may be mounted fixedly to one another to form a single casing centered on the longitudinal axis X-X. Typically, as illustrated in FIGS. 2 to 5, a casing 15, 13, 17, 19 may comprise:
- an upstream portion corresponding, for example, to the intermediate casing 15;
- a central portion corresponding, for example, to the compression casing 13 and, more precisely, to the high-pressure compression casing 132; and
- a downstream portion corresponding, for example, to the additional casing 17, 19, typically the combustion chamber casing 17 and/or the turbine casing 19, the upstream portion 15, the central portion 13 and the downstream portion 17, 19 being arranged successively along the longitudinal axis X-X.

A space may thus be delimited axially by the upstream portion 15 and the downstream portion 17, 19, and radially by the central portion 13, an accessory gearbox 2 being arranged within this space, as detailed hereafter.

Intermediate Casing

The intermediate casing 15 may comprise an outer shell 150 and an intermediate shell hub 152, as shown in FIG. 1.

The intermediate casing hub 152 may be connected to the outer shell 150 by outlet guide vanes 110 (OGV) to straighten a secondary flow A originating from the fan 10 as well as by structural arms 112. As may be seen in FIG. 1, in operation, the secondary flow A may circulate around the compression casing 13, the combustion chamber casing 17 and the turbine casing 19.

The intermediate casing hub 152 may form a separation between a primary stream 100, configured to guide a primary flow B circulating within the compression casing 13, the combustion chamber casing 17 and the turbine casing 19, and intended to participate in the combustion and to the driving of at least one among the high-pressure turbine 160 and the low-pressure turbine 162, and a secondary stream 102, configured to guide the secondary flow A passing through the OGV 110 to generate most of the thrust of the gas turbine engine 1.

In this particular case, the intermediate casing hub 152 may also comprise a downstream shroud 1520, preferably annular, extending radially inward from a downstream part of a frusto-conical portion 18. The frusto-conical portion 18 may be, at least in its downstream portion, substantially concentric with the outer shell 150 and, in the particular case, axisymmetrical around the longitudinal axis X-X.

The intermediate casing hub 152 may be made of metal, for example of titanium, of steel, or of an alloy comprising one or more of these metals.

The intermediate casing hub 152 may also comprise an upstream shroud 1522. In this particular case, the upstream shroud 1522, preferably annular, extends radially inward from an upstream part of the frusto-conical portion 18.

One or more hollow structures (not shown) may be found between the upstream shroud 1522 and the downstream shroud 1520, extending for example in the continuity of the arms which pass through primary stream 100, and optionally in the continuity of the structural arms 112, as illustrated in FIG. 1. These hollow structures allow the passage of utilities, such as lubrication circuits, means for measuring speed, but also of a radial shaft 52.

Eventually, the intermediate casing hub 152 may be a radially inner part of the intermediate casing 15 which, in a double flow gas turbine engine 1 like that illustrated in FIG. 1, separates the primary flow B from the secondary flow A, and the role of which is to allow having a continuity of structure, between the primary flow B and the secondary flow A, to pass forces toward the upstream suspensions of the gas turbine engine 1.

Finally, the intermediate casing hub 15 may serve to attach thrust take-up link rods, air discharge outlets of the low-pressure compressor 120 and different devices such as actuators and probes.

At any event, as may be seen in FIG. 1, the compression casing 13, and more particularly the high-pressure casing 132, may have a relatively small diameter with respect to the diameter of the fan 10. For example, the diameter of the high-pressure casing 132 may, at its attachment with the intermediate casing hub 15, be equal to the inner diameter of the intermediate casing hub 152. For this reason, the high-compression casing 132 may be particularly subject to the phenomenon of ovalization and the bulk may also prove to be a problem.

Accessory Gearbox

With reference to FIG. 1, the gas turbine engine 1 may also comprise an accessory gearbox 2.

Advantageously the accessory gearbox 2 extends along a portion of a ring, typically around the longitudinal axis X-X. In this manner, the accessory gearbox 2 may be provided as close as possible to the longitudinal axis X-X, around the casings 11, 130, 132, 15, 17, 19, so as to keep the gas turbine engine 1 compact. The ring portion may be a circular arc, centered or not on the longitudinal axis X-X. In one variant, the ring portion covers an angular sector of less than 180°, typically less than 120°.

In addition, the accessory gearbox 2 may comprise a plurality of walls defining a housing.

If necessary, the housing may have an upstream face 20, oriented toward the intermediate casing hub 152, and an opposite face, or downstream face 22, oriented downstream of the gas turbine engine 1, for example toward an additional casing 17, 19. The upstream face 20 and/or the downstream face 22 may be substantially flat, and/or extend transversely to the longitudinal axis X-X.

Moreover, the upstream face 20 may be downstream of the intermediate casing hub 152. In particular, the upstream face 20 of the accessory gearbox 2 may be a certain distance downstream of the intermediate casing hub 152, in order to free space for mounting devices 3 on the upstream face 20 of the accessory gearbox 2. In this manner, the devices 3 may be better distributed on the accessory gearbox 2.

In addition, the accessory gearbox 2 may enclose one or more gear trains (not shown) which are driven in rotation by power extracted from a driving shaft 40, 42, such as a high-pressure spool shaft 40 driving together the high-pressure compressor 122 and the high-pressure turbine 160 around the longitudinal axis X-X, or such as a low-pressure spool shaft 42 driving together the low-pressure compressor 120 and the low-pressure turbine 162 around the longitudinal axis X-X.

Figure 5:
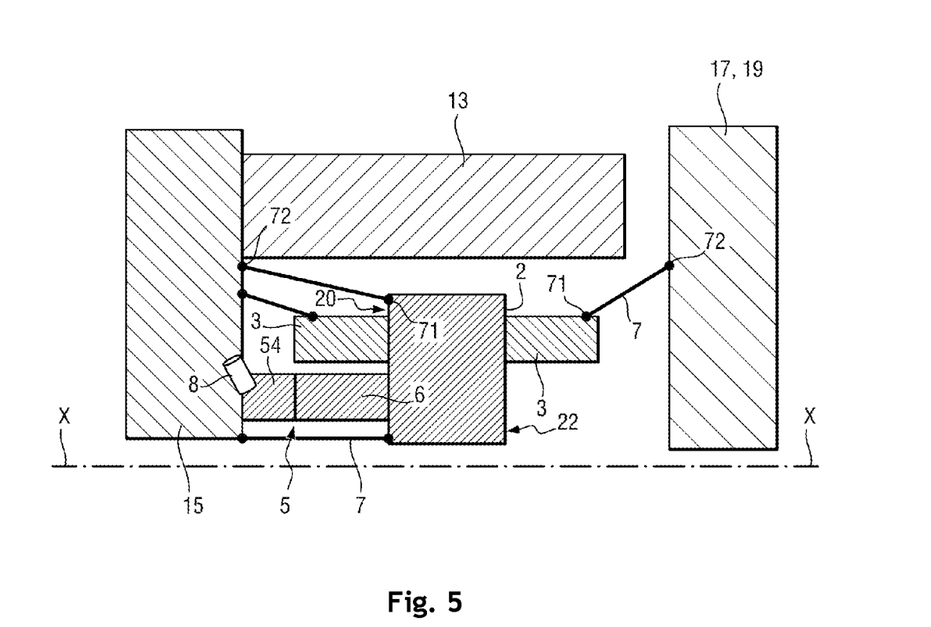
FIG. 5 is a schematic view of a portion of a gas turbine engine according to one exemplary embodiment of the invention.

With reference to FIG. 5, described in more detail hereafter, one or more devices 3 may be mounted fixedly on the accessory gearbox 2, typically on the upstream face 20 and/or on the downstream face 22 of the housing. The devices 3, which are distinct from the transfer gearbox 5 described hereafter, may each have a drive shaft (not shown) which is coupled to one of the gears of the accessory gearbox 2. The drive shafts may extend in a direction substantially parallel to the longitudinal axis X-X. The devices 3 may have an axial dimension less than the distance, particularly axial, between the upstream face 20 and the downstream shroud 1520 of the intermediate casing hub 152. Among these devices 3, it is possible to provide one or more elements among the following, in one or more samples: an electrical generator for supplying electrical power to the aircraft, an alternator to supply electrical current to electrical equipments of the gas turbine engine 1, a starter to start the gas turbine engine 1, a hydraulic pump to supply hydraulic power to the aircraft, a fuel pump and a lubrication pump.

Transfer Gearbox

With reference to FIG. 1, the gas turbine engine 1 may comprise a transfer gearbox 5 (TGB).

The transfer gearbox 5 may then include a power transmission shaft 50, which it houses at least in part. The power transmission shaft 50 is, if necessary, configured to transmit mechanical power, extracted from the driving shaft 40, 42 to at least one device mounted fixedly on the accessory gearbox 2, if necessary via the gearing. The power transmission shaft 50 may extract mechanical power from the driving shaft 40, 42 through the radial arm 52, which is configured to extract mechanical power from the driving shaft 40, 42. In addition, the power transmission shaft 50 may extend substantially perpendicularly to the upstream face 20 of the accessory gearbox 2.

If necessary, the transfer gearbox 5 may comprise an angle gear 54 connecting the power transmission shaft 50 to the radial shaft 52 so as to form a kinematic connection between the radial shaft 52 and the power transmission shaft 50. For example, the angle gear 54 may comprise a coupling of conical pinions.

As illustrated in FIG. 1, the angle gear 54 may be located between the upstream shroud 1522 and the downstream shroud 1520 of the intermediate casing hub 152.

At all events, the transfer gearbox 5 may extend between the intermediate casing hub 152, which partially houses the driving shaft 40, 42, and if necessary the radial shaft 52, and the accessory gearbox 2.

Figure 2:
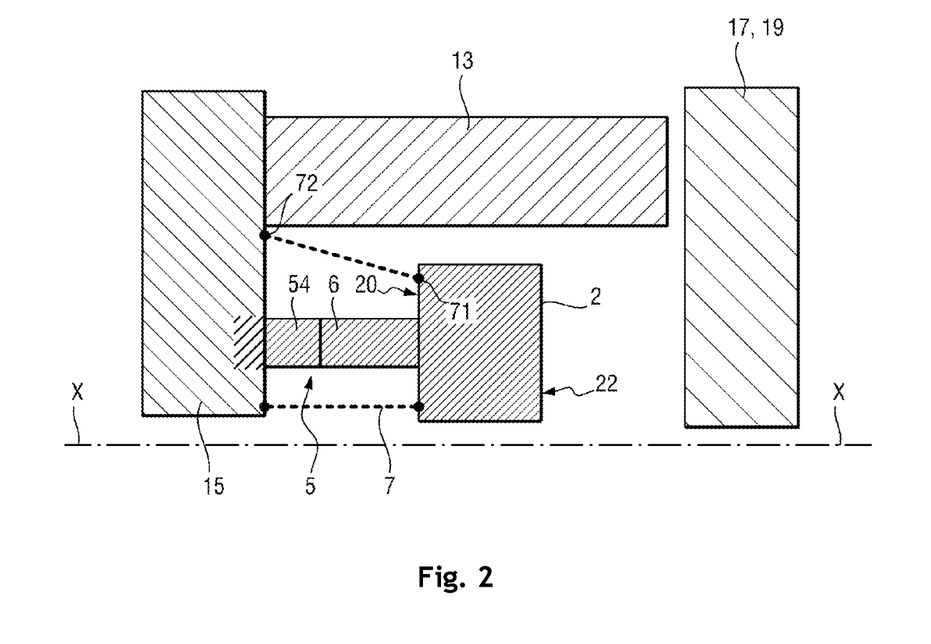
FIG. 2 is a schematic view of a portion of a gas turbine engine according to one exemplary embodiment of the invention.
Figure 4:
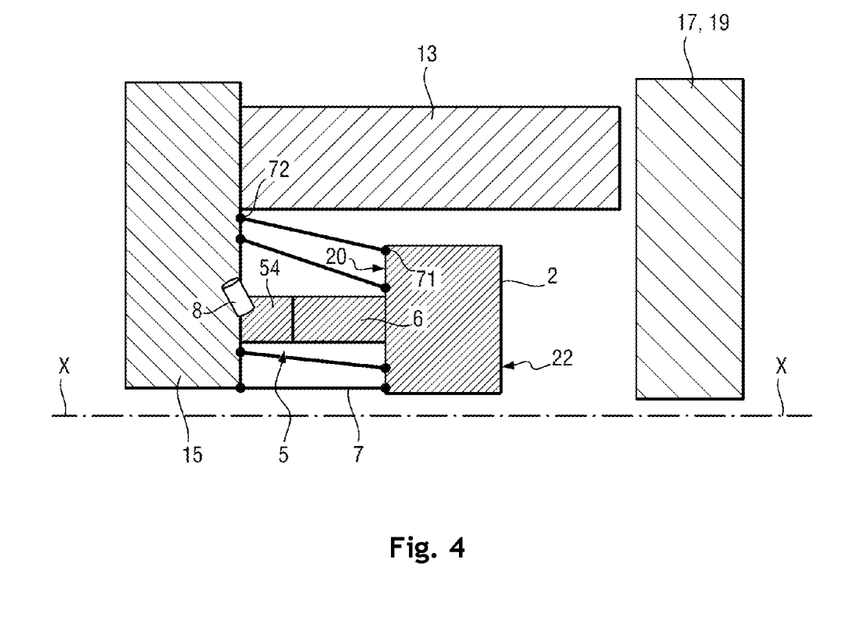
FIG. 4 is a schematic view of a portion of a gas turbine engine according to an exemplary embodiment of the invention.

Finally, the transfer gearbox 5 may be mounted against the upstream face 20 of the accessory gearbox 2, as detailed hereafter, for example with reference to FIGS. 2, 4 and 5.

Attachment of the Accessory Gearbox

As may be seen in FIG. 1, the accessory gearbox 2 is preferably arranged axially at a distance from the intermediate casing 15, but also from at least one of the additional casings 17, 19.

In addition, the accessory gearbox 2 may be arranged radially at a distance from the high-pressure compressor casing 132.

However, as may be seen more precisely in FIGS. 2 to 5, which illustrate particular embodiments of the gas turbine engine 1 illustrated in FIG. 1, the accessory gearbox 2 may advantageously be solely attached to the intermediate casing 15 and, if necessary, to at least one of the additional casings 17, 19. In this manner, the attachment of the accessory gearbox 2 within the gas turbine engine 1 is ensured, without however jeopardizing the mechanical strength of the compression section 12.

More precisely, due to the dispositions illustrated in FIGS. 2 to 5, the accessory gearbox 2, although attached to the intermediate casing 15, may be positioned downstream of the intermediate casing 15. Thus, the accessory gearbox 2 may be positioned axially with respect to the intermediate casing 15, at the compression casing 13, more particularly at the high-pressure compressor casing 132, without however being attached to the compression casing 13.

That is why, in this case, the ovalization phenomena are avoided, particularly when the compression casing 13 has a small size compared to the size of the fan 10. However, accessibility and maintenance of the accessory gearbox 2 are unchanged for the operators, despite this change in attachment with respect to the prior art.

In the embodiments illustrated in FIGS. 2 to 5, the accessory gearbox 2 may at attached to the intermediate casing 15 so as to be found, in the operating position, primarily below a longitudinal axis of the intermediate casing hub 152, which may be congruent with the longitudinal axis X-X of the gas turbine engine 1. The operating position is a position in which the gas turbine engine 1 is itself assembled to an aircraft. In this position, at least 50% of the volume of the accessory gearbox 2 is located below the longitudinal axis of the intermediate casing 152. Such situations are encountered when the accessory gearbox 2 is said to be "mounted at six o'clock" (6 h), for example, referring to an imaginary clock in which the 12 o'clock-6 o'clock axis is aligned with the vertical, 12 o'clock being on top and 6 o'clock being at the bottom. This position, which facilitates maintenance below the wing of the aircraft and the recovery of fluids during operation and upon stopping the gas turbine engine 1, also minimizes the risk of fire because possible leaks are evacuated by gravity, if necessary via a nacelle (not shown) of the gas turbine engine 1, which makes it all the more advantageous not to attach the accessory gearbox 2 to the compression casing 13. The accessory gearbox 2 may also be mounted at 5 o'clock, at 7 o'clock or at any other type of hour. The reference point may be a center of gravity of the accessory gearbox 2, possibly provided with its devices 3.

In the embodiment illustrated in FIG. 2, the transfer gearbox 5 may comprise a structural element 6 forming a/the attachment system allowing attaching, preferably rigidly, the accessory gearbox 2 on the intermediate casing 15 and, advantageously, on the intermediate casing 152. A structural element 6 is an element configured to take on a role of structural support and force recovery. In this case, in the embodiment illustrated in FIG. 2, the structural element 6 allows the autonomous attachment of the accessory gearbox 2 to the intermediate casing 15, even if, naturally, other elements may intervene to take on the forces according to certain degrees of freedom, as will be described hereafter, but also with reference to FIGS. 4 and 5. In other words, in any case in the embodiment illustrated in FIG. 2, the structural element 6 is such that, without it, the accessory gearbox 2 would not be attached to the intermediate casing hub 152.

In a preferred manner, the structural element 6 is formed by a cover 6 of the transfer gearbox 5, which is a simple and robust element, the cover 6 surrounding the power transmission shaft 50 (which is therefore no longer visible in FIG. 2). The cover 6 may be an outer housing of the transfer gearbox 5, configured to house the rest of the transfer gearbox 5, typically by being attached on the one hand to the accessory gearbox 2 and on the other hand to the angle gear 54, said angle gear 54 being attached to the intermediate casing 15, preferably rigidly. Moreover, in this embodiment, the cover 6 of the transfer gearbox 5 may be reinforced so as to be capable of supporting the weight of the accessory gearbox 2 and of the devices 3 that it carries, and to retain the accessory gearbox 2 attached to the intermediate casing 15.

Advantageously, the cover 6 is formed mainly by a wall which may be cylindrical, with a circular, elliptical, ellipsoidal, square, rectangular polygonal or other cross section.

If necessary, the cover 6 may comprise longitudinal and/or circumferential reinforcements to give it the desired stiffness. The reinforcements may, if necessary, be provided on the inside or, preferably on the outside of the wall of the cover 6.

The cover 6 may be metallic, for example steel, titanium, aluminum or alloys comprising at least one of these metals, or of metal matrix composite or of organic matrix composite.

The cover 6 may be attached to a circumferentially central portion of the accessory gearbox 2, or more generally to a portion such that the weight of the accessory gearbox 2 and of the device 3 on either side of this portion are balanced. The cover 6 may be linked to the accessory gearbox 2 by bolting, a V-band type collar, or other attachment modes, preferably removable, which are sufficiently robust to allow the preferably rigid attachment of the accessory gearbox 2 to the intermediate casing hub 152. The cover 6 may be attached to the upstream face 20 of the accessory gearbox 2, for example via a bolted flange.

As may be seen in FIG. 2, the attachment system may comprise at least one tie rod 7, or at least two tie rods 7, in this case exactly two tie rods 7. The tie rod 7 then connects the accessory gearbox 2 to the intermediate casing 15, in order to provide for taking up forces, for example axial forces, tensile for example. In this case, the two tie rods 7 may be provided on either side of the cover 6, so as to limit the oscillation of the accessory gearbox 2 around the attachment zone of the cover 6 on the accessory gearbox 2.

More precisely, in the embodiment illustrated in FIG. 2, these tie rods 7 allows taking up primarily the moments along three orthogonal axes, these moments being able in particular to become significant when the accessory gear drive 2 is dimensioned to carry at least three devices 3 or even two devices 2 of large size and/or mass, while the structural element 6 may be configured, in the embodiment illustrated in FIG. 2, to take up primarily the forces along the three orthogonal axes. Providing tie rods 7 on either side of the structural element 6 also allows distributing the force recovery between the two tie rods 7.

The tie rod 7 may be attached to the accessory gearbox 2, typically to the housing, for example at its upstream face 20, by a first linkage 71 and to the intermediate casing 15 by a second linkage 72. One or the other of the first linkage and of the second linkage may be articulated, typically by being of the ball type, so that the forces are taken up solely in the axis of the tie rods 7 (in tension and/or compression).

An articulation may comprise two parts mechanically in movement with respect to one another, in which case the tie rod 7 concerned may be a link rod, for example a ball jointed link rod, and/or comprise an elastically deformable portion so as to allow a certain movement of the tie rod 7, which may then be a simple beam, with respect to the intermediate casing 15 and/or to the accessory gearbox 2. In other examples, the first linkage 71 and/or the second linkage 72 may be a ball joint like that illustrated in FIGS. 6 and 7, and described hereafter.

Alternatively, or in addition, the second linkage 72 may comprise a flexible pad, for example comprising a succession of metallic layers and layers of prestressed elastomer. In other variants, shackles may also be used for the first linkage 71 and/or the second linkage 72.

These linkages 71, 72 may be switched, or made identical to one another, or still other linkages may be used, for example bolted joints, particularly associated with means of adjusting the mounting of the tie rod 7 to compensate the overdeterminate character of the system for attaching the accessory gearbox 2 to the intermediate casing 5 as illustrated in FIG. 2.

With reference to FIG. 2, the first linkage 71 may be provided on a peripheral surface of the accessory gearbox 2, or more generally on a surface distinct from the upstream face 20 and from the downstream face 22, which leaves said faces 20, 22 available for mounting devices 3.

Between the first linkage 71 and the second linkage 72, the tie rod 7 may be a beam or a link rod, typically metallic or composite. The cross section of a beam or link rod of this type may be dimensioned, for example with an H shaped cross section or a hollow cross section, particularly of circular, ellipsoidal, square, rectangular or polygonal shape, depending on the length and/or mass constraints. Moreover, a tie rod 7 in the form of a hollow cylindrical link rod may be of different natures: either a drilled or extruded tube, typically with a connector applied by screwing or by welding, or a drilled single-piece link rod provide with double connectors, for example in the form of forks. At all events, the tie rod 7 may have a length that is adjustable, typically by means of adapter sleeves mounted at each end of the tie rod 7, for example by means of a threaded linkage. This however is not limiting, because other means for adapting the length of the tie rods 7 may be contemplated, for example in the body of the tie rod 7 which then takes the form of a link rod with an adjustable axial length.

As illustrated in FIG. 2, the gas turbine engine 1 may, in this embodiment, be bereft of other attachments between the accessory gearbox 2 and the intermediate casing 15 than the structural element 6, namely the cover 6 and the (or the two) tie rod(s) 7. The number of attachments of the accessory gearbox 2 to the intermediate casing 15 is therefore minimized, which further releases more design freedom for other aspects of the gas turbine engine 1. Consequently, the dimensioning of the assembly is facilitated and the attachment necessitates less adjustment during its assembly.

Figure 3:
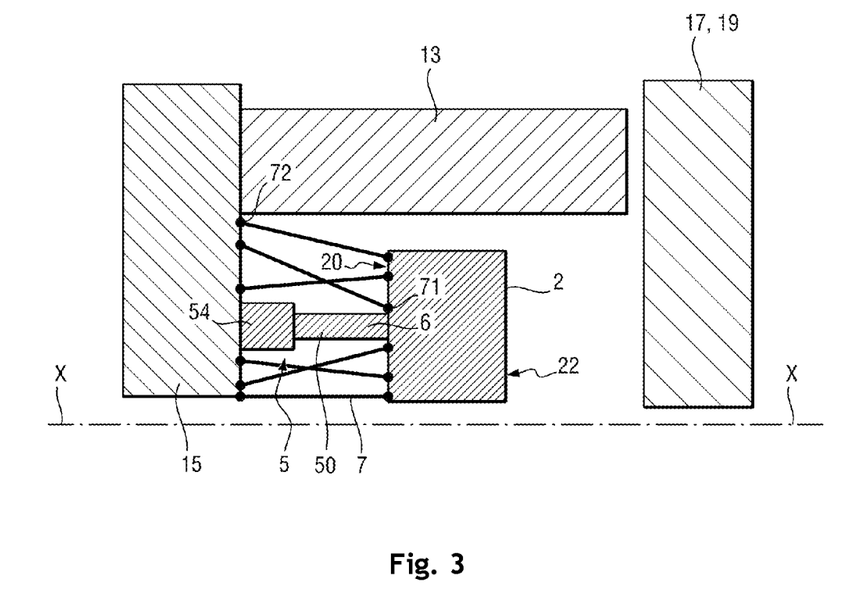
FIG. 3 is a schematic view of a portion of a gas turbine engine according to one exemplary embodiment of the invention.

In the embodiments illustrated in FIGS. 3 to 5, the accessory gearbox 2 may be attached to the intermediate casing 15 by means of an attachment system comprising at least three tie rods 7 connecting the accessory gearbox 2 to the intermediate casing 15, preferably to the intermediate casing hub 15. This offers a less voluminous and less massive alternative than the embodiment illustrated in FIG. 2. In addition, this configuration offers more flexibility in the manner of assuming the different degrees of freedom between the accessory gearbox 2 and the intermediate casing 15, or even the transfer gearbox 5, this in order to determine the best possible compromise between the need for distributing forces, bulk, and mass of the attachment system as such. In other words, this configuration limits the risk of overdeterminacy that the attachment system as illustrated in FIG. 2 presents.

In the embodiments illustrated in FIGS. 3 to 5, the tie rods 7 and their linkages 71, 72 to the accessory gearbox 2 as well as to the intermediate casing 15, may be identical to what has already been described with reference to FIG. 2. In particular, each of the tie rods 7 may have an adjustable length and/or be connected to one at least among the accessory gearbox 2, the intermediate casing 15 and the additional casing by means of a ball joint 71, 72 like that illustrated in FIGS. 6 and 7, described hereafter. In fact, this type of tie rod 7 and or linkage 71, 72 offers an attractive compromise between robustness, lightness, and adaptability to the constraints specific to this gas turbine engine 1 area. Finally, in an advantageous variant, at least one of the tie rods 7 is connected to the housing, typically by means of a first linkage 71 as already described with reference to FIG. 2. This allows simplifying mounting. At any event, the angle between a main direction of each tie rod 7 and the longitudinal axis X-X may be adapted depending on the degree of freedom which it is desired to assume, but also integration constraints and the desired dimensioning margins for the gas turbine engine 1.

In addition, in the embodiment illustrated in FIG. 2, as in the embodiments illustrated in FIGS. 3 to 5, the attachment system may comprise at least one tie rod 7 connecting the accessory gearbox 2 to one at least of the additional casing 17, 19. This is illustrated in particular in FIG. 5. This configuration allows for example reducing the size of the accessory gearbox 2. In fact, reducing the size of the accessory gearbox 2, and particularly the radial dimensions of its upstream face 20, leaves less space available for the first linkage 71 of the tie rods 7. That is why deporting the first linkage 71 of a tie rod 7 on the downstream face 22 of the accessory gearbox 2, as may be seen in FIG. 5, allows connecting it to one of the additional casings 17, 19, typically by means of a second linkage 72 like that already described with reference to FIG. 2. Ad all events, connecting the accessory gearbox 2 to one at least of the additional casings 17, 19 facilitates the integration of the accessory gearbox 2, particularly assuming that the intermediate casing 15 did not have sufficient space to house all the second linkages 72 of the tie rods 7.

Moreover, in the embodiment illustrated in FIG. 2, as in the embodiments illustrated in FIGS. 3 to 5, at least one of the tie rods 7 may be connected to a device 3, typically by means of a first linkage 71 like that already described with reference to FIG. 2. This is illustrated in particular in FIG. 5. There too, this allows reducing the need for attachment space of the tie rods 7 on the accessory gearbox 2, typically on the upstream face 20 of the housing, while increasing the load distribution possibilities. This is all the more decisive because current developments in the aeronautical field tend to make devices 3 heavier, particularly by conferring electrical capabilities on them.

With reference to FIG. 3, the attachment system may comprise at least six tie rods 7, or even exactly six tie rods 7, in order to take up the six degrees of freedom of the accessory gearbox 2 with respect to the intermediate casing 15 and/or to one at least of the additional casings 17, 19. In this case, as may be seen in FIG. 3, no structural element 6 connects the accessory gearbox 2 to the transfer gearbox 5. On the other hand, the angle gear 54 is advantageously attached, preferably rigidly, to the intermediate casing 15, typically to the intermediate casing hub 152.

In the embodiments illustrated in FIGS. 4 and 5, the transfer gearbox 5 may also comprise a structural element 6 belonging to the attachment system, and surrounding the power transmission shaft 50, the structural element 6 being attached, preferably rigidly, to the accessory gearbox 2 and to the angle gear 54, in the same manner as already described with reference to FIG. 2. The structural element 6 may then be substantially similar to that already described with reference to FIG. 2. The structural element 6 may also, advantageously, have a smaller volume and mass than that already described with reference to FIG. 2, because the quantity of forces that the structural element 6 will need to take up, in the embodiments illustrated in FIGS. 4 and 5, is smaller than in the embodiment illustrated in FIG. 2. On the other hand, in the embodiments illustrated in FIGS. 4 and 5, the angle drive 54 is not attached to the intermediate casing 15, but rather mounted on the intermediate casing 15, preferably to the intermediate casing 15 hub, by means of a slide link 8. The slide link may have different directions in which it allows translation of the angle gear 54 with respect to the intermediate casing, as long as the direction of translation is unique. This as long as the slide link 8 prevents translation movements of the angle gear 54 with respect to the intermediate casing 15 in any direction orthogonal to the direction of translation allowed by the slide link 8. With that provision, as may be seen in FIGS. 4 and 5, the use of four tie rods 7 in the attachment system is sufficient. This allows limiting the number of first linkages 71 on the accessory gearbox 2 and, by so doing, improving the compactness and reducing the mass of the assembly. In addition, this allows limiting the number of second linkages 72 of the tie rods 7 on the intermediate casing 15. Alternatively, or additionally, one at least of the tie rods 7 may be connected to the angle gear 54 or to the structural element 6. In other word, the first linkage 71 of the tie rod 7 is not located on the accessory gearbox 2, but on the angle gear 54 or on the structural element 6.

At all events, due to the attachment systems as described previously and illustrated in FIGS. 2 to 5, it is possible to adjust the taking up of forces and the distribution of loads of the accessory gearbox 2, typically the cantilever, this in particular due to the adjustment of the angle between the main direction of each tie rod 7 and the longitudinal axis X-X. In addition, it is possible to adapt the attachment system to accessory gearboxes and to intermediate 15 and additional 17, 19 casings having any type of dimensions. Moreover, these attachment systems may be easily optimized, both in terms of mass as in stiffness, particularly with regard to the dynamic and/or thermal behavior of the assembly formed by the accessory gearbox 2, the intermediate casing 15 and/or the additional casing 17, 19 during the operation of the gas turbine engine 1.

Tie Rod and Ball Linkage

Figure 6:
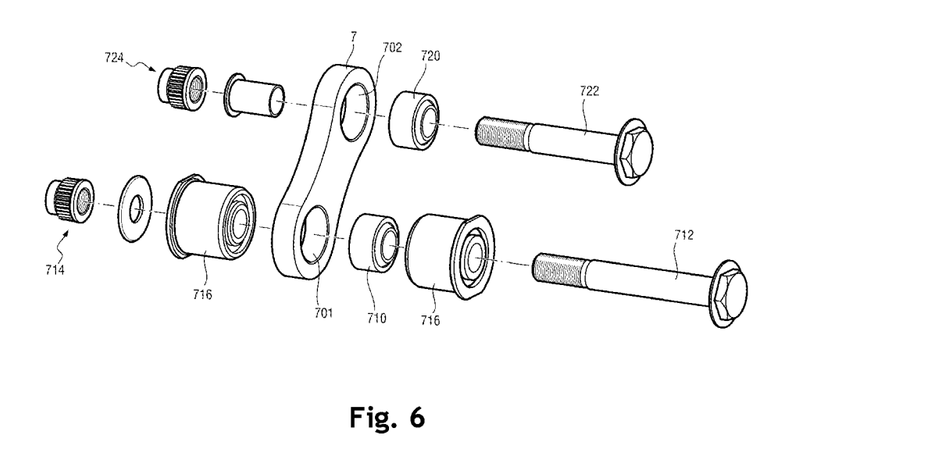
FIG. 6 is an exploded view of an exemplary embodiment of a tie rod and of ball joints.
Figure 7:
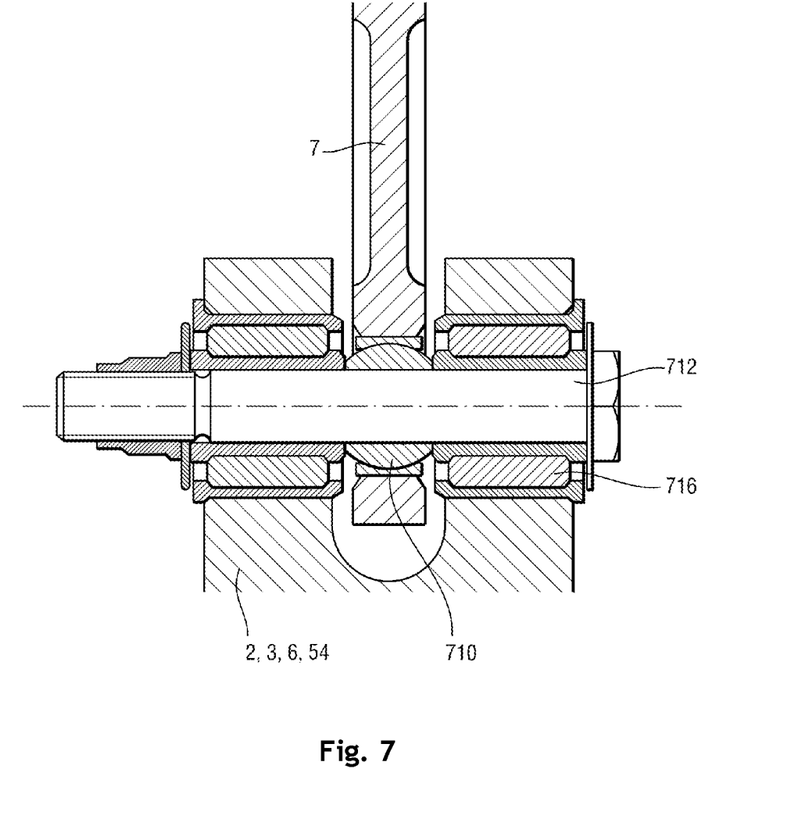
FIG. 7 is a section view of FIG. 6.

With reference to FIGS. 6 and 7, an example of a tie rod 7, of a first linkage 71, and of a second linkage 72 is illustrated.

As may be seen in these figures, two orifices 701, 702 are provided at each of the axial ends of the tie rod 7. The first orifice 701 is intended to form the first linkage 71, while the second orifice is intended to form the second linkage 72.

A first ball 710 and a second ball 720 are respectively housed inside each of the first orifice 701 and of the second orifice 702. In addition, a first suspension pin 712 passes through the first orifice 701 and the first ball 710, from side to side, and a second suspension pin 722 passes through the second orifice 702 and the second ball 720, also from side to side. Moreover, as may be seen in FIG. 6, on the side opposite to the head of the first suspension pin 712, is located a first assembly 714 formed from a first nut and a washer, which are arranged to attach the first suspension pin 712 to the accessory gearbox 2, a device 3, the structural element 6 or the angle gear 54. In the same manner, on the side opposite to the head of the second suspension pin 722, a second assembly 724, formed from a second nut and a washer, is arranged to attach the second suspension pin 722 to the intermediate casing 15 or the additional casing 17, 19.

The cooperation of the first pin 712, of the first ball 710, of the first orifice 701 and of the first assembly 714, forms the first linkage 71. Likewise, the cooperation of the second pin 722, of the second ball 720, of the second orifice 702 and of the second assembly 724 forms the second linkage 72.

Optionally, a vibration-damping bearing 716 may be housed on the accessory gearbox 2, a device 3, the structural element 6, the angle gear 54, the intermediate casing 15 or the supplementary casing 17, 19. The vibration-damping bearing 716 appears in two distinct portions interlocking on either side of the orifice 701, 702 of the linkage 71, 72 in which it is used, the suspension pin 712, 722 also passing through the vibration-damping bearing 716 from side to side. FIGS. 6 and 7 illustrate a vibration-damping bearing 716 in the first linkage 71.

The invention claimed is:

1. An assembly comprising:
   a casing centered on a longitudinal axis and comprising an upstream portion, a central portion and a downstream portion arranged successively along the longitudinal axis;
   an attachment system comprising a plurality of tie rods; and
   an accessory gearbox arranged within a space delimited axially by the upstream portion and the downstream portion and radially by the central portion, the accessory gearbox being attached to the casing only by the attachment system, and the accessory gearbox being attached to only one of the upstream portion or the downstream portion.

2. The assembly of claim 1, wherein the accessory gearbox is arranged axially at a distance from the upstream portion.

3. The assembly of claim 1, wherein the attachment system comprises from three to six tie rods.

4. The assembly of claim 1, wherein at least one tie rod has an adjustable length.

5. The assembly of claim 1, wherein at least one of the plurality of tie rods is connected to one at least one among the accessory gearbox, the upstream portion and the downstream portion by means of a ball joint.

6. The assembly of claim 1, wherein the accessory gearbox comprises a plurality of walls defining a housing on which at least one device is fixedly mounted, at least one of the plurality of tie rods being connected to the housing.

7. The assembly of claim 1, further comprising a transfer gearbox comprising:
   a power transmission shaft configured to transmit mechanical power extracted from a driving shaft of a gas turbine engine to the accessory gearbox;
   a radial shaft configured to extract mechanical power from the driving shaft; and
   an angle gear connecting the power transmission shaft to the radial shaft, the angle gear being attached to the upstream portion.

8. The assembly of claim 1, further comprising a transfer gearbox comprising:
   a power transmission shaft configured to transmit mechanical power extracted from a driving shaft of a gas turbine engine to the accessory gearbox;
   a radial shaft configured to extract mechanical power from the driving shaft;
   an angle gear connecting the power transmission shaft to the radial shaft and being mounted on the upstream portion by means of a slide link; and
   a structural element surrounding the power transmission shaft, the structural element being rigidly attached to the accessory gearbox and to the angle gear.

9. A gas turbine engine comprising:
   a compression section comprising a low-pressure compressor and a high-pressure compressor;
   a low-pressure compressor casing housing the low-pressure compressor;
   a high-pressure compressor casing housing the high-pressure compressor;
   an intermediate casing centered on the longitudinal axis and extending between the low-pressure compressor casing and the high-pressure compressor casing;
   an additional casing extending downstream of the high-pressure compressor casing; and
   the assembly of claim 1,
   wherein the intermediate casing comprises the upstream portion, the high-pressure compressor casing comprises the central portion and the additional casing comprises the downstream portion.

10. The assembly of claim 1, wherein the attachment system comprises at least three tie rods.

* * * * *